United States Patent [19]

Nikaido et al.

[11] 3,963,568

[45] June 15, 1976

[54] PROCESS FOR COATING ALUMINUM OR ALUMINUM ALLOY

[75] Inventors: Norio Nikaido; Shinji Shirai; Mototaka Iihashi; Sueo Umemoto, all of Hiratsuka, Japan

[73] Assignees: Kansai Paint Company, Ltd.; Fuji Sashi Industries, Limited, both of Japan

[22] Filed: May 28, 1974

[21] Appl. No.: 474,052

[30] Foreign Application Priority Data

May 30, 1973 Japan.............................. 48-61068
Aug. 24, 1973 Japan.............................. 48-95473
Nov. 20, 1973 Japan............................ 48-131095

[52] U.S. Cl. .................................................. 204/181
[51] Int. Cl.² ................. C25D 13/06; C25D 13/10; C25D 13/20
[58] Field of Search ................................... 204/181

[56] References Cited
UNITED STATES PATENTS 3,544,440   12/1970   Weigel .............................. 204/181
3,622,473   11/1971   Ohta et al. ......................... 204/181
3,645,872   2/1972    Weigel .............................. 204/181

Primary Examiner—Howard S. Williams
Attorney, Agent, or Firm—Larson, Taylor and Hinds

[57] ABSTRACT

In coating aluminum or aluminum alloy by contacting the aluminum or aluminum alloy with hot water or steam to form an aluminum oxide layer on its surface and thereafter electrophoretically coating the aluminum or aluminum alloy with an electrophoretic coating composition to form a resin layer, a process which is characterized in that said electrophoretic coating composition contains at least one water-soluble salt of an oxyacid selected from the group consisting of silicic acid, boric acid, phosphoric acid, vanadic acid, tungstic acid, permanganic acid, molybdic acid and stannic acid.

11 Claims, No Drawings

PROCESS FOR COATING ALUMINUM OR ALUMINUM ALLOY

The invention relates to a process for coating aluminum or aluminum alloy, more particularly to a process for electrophoretically coating aluminum or aluminum alloy.

It is impossible to coat aluminum or aluminum alloy directly with an organic coating composition due to its poor ability to adhere to the organic coating composition. Various improved processes have heretofore been proposed, therefore. According to one of the proposed processes, aluminum or aluminum alloy is subjected to so-called boehmite treatment by contacting the same with hot water or steam containing or not containing ammonia or amines to form an aluminum oxide layer on its surface which layer is predominantly composed of $Al_2O_3 \cdot nH_2O$ wherein n is usually an integer of 1 to 3 and the aluminum or aluminum alloy is thereafter coated with an organic coating composition. Although aluminum or aluminum alloy can be coated with the organic coating composition by this process, the adhesion between the organic coating and the aluminum oxide layer formed is still poor. Furthermore, the aluminum oxide film produced by the boehmite treatment has a thickness of as small as up to about $1.0\mu$ and is insufficient in toughness and texture. Therefore, if the organic coating formed thereon should be marred for one cause or another, corrosion may possibly develop in the aluminum oxide coating from that portion. Such drawbacks pose a serious problem in the case of aluminum sash and other external building materials.

An object of this invention is to provide a process for coating aluminum or aluminum alloy subjected to boehmite treatment with an organic coating composition with high adhesion.

Another object of this invention is to provide a process for coating capable of forming a highly corrosion-resistant coating on aluminum or aluminum alloy which has been subjected to boehmite treatment.

Other objects of this invention will become apparent from the following description.

The foregoing objects of this invention can be fulfilled by electrophoretically coating aluminum or aluminum alloy with an electrophoretic coating composition containing at least one water-soluble salt of an oxyacid selected from the group consisting of silicic acid, boric acid, phosphoric acid, vanadic acid, tungstic acid, permanganic acid, molybdic acid and stannic acid after the aluminum or aluminum alloy has been subjected to boehmite treatment.

Our researches have revealed the following results:

1. When aluminum or aluminum alloy is subjected to boehmite treatment and then electrophoretically coated with an electrophoretic coating composition containing at least one of the above-mentioned oxyacid salts, the oxyacid anions resulting from the dissociation of the oxyacid salt in the coating composition release their charges upon reaching the surface of the anode, namely the aluminum oxide layer produced by the boehmite treatment, prior to the deposition of the resin ingredient of the composition, and react with the aluminum oxide layer to form a new tough layer of fine texture. Subsequently, the resin in the organic coating composition is deposited on the new layer to form an organic coating film. The new layer thus produced has a greatly improved ability to adhere to the organic coating composition, consequently permitting the formation of an organic film on aluminum or aluminum alloy with high bond strength.

2. As compared with the aluminum oxide layer produced only by the boehmite treatment, the new layer obtained as above has a considerably larger thickness, improved toughness and fine texture and is therefore much more resistant to corrosion than the aluminum oxide layer alone. As a result, the new layer gives the metal substrate an improved ability to adhere to the organic coating composition and remarkably enhanced resistance to corrosion. Thus even if the organic coating film formed thereon should be marred for one cause or another, the greatly improved corrosion resistance of the new layer itself enables the coated aluminum or aluminum alloy to remain much more resistant to corrosion than the coated product prepared by boehmite treatment and subsequent coating in conventional manner.

Any of a wide variety of electrophoretic coating compositions heretofore known is effective to use in the process of this invention. Such coating composition is prepared by dissolving or dispersing a binder resin which is water-soluble or water-dispersible in an aqueous medium. If necessary, pigments, extender pigments and like suitable additives can be added to the composition. Usable as the binder resin is any of those conventionally known which are typically synthetic polycarboxylic acid resins. Examples of the polycarboxylic acid resins are addition products of drying oils and $\alpha,\beta$-ethylenically unsaturated dibasic acids such as maleic acid, epoxy resin esterified with fatty acid and having carboxyl groups, alkyd resin having carboxyl groups, copolymer of vinyl monomer and acrylic or methacrylic acid, polyester having carboxyl groups, a reaction product of polybutadiene and $\alpha,\beta$-ethylenically unsaturated dibasic acid such as maleic acid, etc. The binder resin concentration of the coating composition is in the range of 1 to 20 weight percent, preferably 5 to 15 weight percent. Usable pigments are coloring pigments such as titanium oxide, red iron oxide, Phthalocyanine Blue, carbon black and the like and extender pigments such as talc, baryta, Asbestine and clay. Usually, such pigment is used in an amount of about 1 to 30 parts by weight per 100 parts by weight of the binder resin. The liquid medium is usually water or a mixture of water and an organic solvent. The solvent to be used is miscible with water and can dissolve the binder resin therein. The amount of the organic solvent to be used is usually less than 10 weight percent based on water. Examples of the solvent are methylcyclohexanol, benzyl alcohol, n-butanol, butyl cellosolve, isopropyl cellosolve, methyl cellosolve, isopropanol, carbitol, ethanol, etc. The other additives are conventionally known plasticizer, drying agent, dispersing agent, emulsifier, wetting agent, defoaming agent and the like.

According to the present invention it is essential to add to the above conventional electrophoretic coating composition at least one salt of oxyacids such as silicic acid, boric acid, phosphoric acid, permanganic acid, vanadic acid, tungstic acid, molybdic acid and stannic acid. The oxyacid salts to be used are those having water-solubilities of more than 0.001 g at 20°C in 100 ml water and include various salts of the above oxyacids with monovalent to trivalent metals, ammonia or organic amines. The silicates include orthosilicates, metasilicates and disilicates and like polysilicates. Examples thereof are sodium orthosilicate, potassium orthosilicate, lithium orthosilicate, sodium metasilicate, potassium metasilicate, lithium metasilicate, lithium pentasilicate, barium silicate, calcium silicate, ammonium silicate, tetramethanol ammonium silicate, triethanol ammonium silicate, etc. The borates include metaborates, tetraborates, pentaborates, perborates, biborates, borate-hydrogen peroxide addition products and boroformates. Examples are lithium metaborate ($LiBO_2$), potassium metaborate ($KBO_2$), sodium metaborate ($NaBO_2$), ammonium metaborate, lithium tetraborate ($Li_2B_4O_7 \cdot 5H_2O$), potassium tetraborate, sodium tetraborate, ammonium tetraborate [$(NH_4)_2B_4O_7 \cdot 4H_2O$], calcium metaborate [$Ca(BO_2)_2 \cdot 2H_2O$], sodium pentaborate ($Na_2B_{10}O_{16} \cdot 10H_2O$), sodium perborate ($NaBO_2 \cdot H_2O_2 \cdot 3H_2O$), sodium borate-hydrogen peroxide addition product ($NaBO_2 \cdot H_2O_2$), sodium boroformate ($NaH_2BO_2 \cdot HCOOH \cdot 2H_2O$), ammonium biborate [$(NH_4)HB_4O_7 \cdot 3H_2O$], etc.

The phosphates include orthophosphates, pyrophosphates and polymetaphosphates. Examples are potassium monobasic phosphate ($KH_2PO_4$), sodium pyrophosphate ($Na_4P_2O_7$), sodium metaphosphate ($NaPO_3$), calcium dibasic phosphate ($CaHPO_4 \cdot 2H_2O$), aluminum hydrophosphate [$Al(H_2PO_4)_3$], etc. The vanadates include orthovanadates, metavanadates and pyrovanadates. Examples are lithium orthovanadate ($Li_3VO_4$), sodium orthovanadate ($Na_3VO_4$), lithium metavanadate ($LiVO_3 \cdot 2H_2O$), sodium metavanadate ($NaVO_3$), potassium metavanadate ($KVO_3$), ammonium metavanadate ($NH_4VO_3$) or [$(NH_4)_4V_4O_{12}$], sodium pyrovanadate ($Na_2V_2O_7$), etc. The tungstates include orthotungstates, metatungstates, paratungstates, pentatungstates and heptatungstates. Also employable are phosphorus wolframates, borotungstates and like complex salts. Examples are lithium tungstate ($Li_2WO_4$), sodium tungstate ($NaWO_4 \cdot 2H_2O$), potassium tungstate ($K_2WO_4$), barium tungstate ($BaWO_4$), Calcium tungstate ($CaWO_4$), strontium tungstate ($SrWO_4$), sodium metatungstate ($Na_2W_4O_{13}$), potassium metatungstate ($K_2W_4O_{13} \cdot 8H_2O$), sodium paratungstate ($Na_6W_7O_{24}$), ammonium pentatungstate [$(NH_4)_4W_5O_{17} \cdot 5H_2O$], ammonium heptatungstate [$(NH_4)_6W_7O_{24} \cdot 6H_2O$], sodium phosphowolframate ($2Na_2O \cdot P_2O_5 \cdot 12WO_3 \cdot 18H_2O$), barium borotungstate ($2BaO \cdot B_2O_3 \cdot 9WO_3 \cdot 18H_2O$), etc. Examples of permanganates are lithium permanganate ($LiMnO_4$), sodium permanganate ($NaMnO_4 \cdot 3H_2O$), potassium permanaganate ($KMnO_4$), ammonium permanganate [$(NH_4)MnO_4$], calcium permanganate [$Ca(MnO_4)_2 \cdot 4H_2O$], barium permanganate [$Ba(MnO_4)_2$], magnesium permanganate [$Mg(MnO_4)_2 \cdot 6H_2O$], strontium permanganate [$Sr(MnO_4)_2 \cdot 3H_2O$], etc. The stannates include orthostannates and metastannates. Examples are potassium orthostannate ($K_2SnO_3 \cdot 3H_2O$), lithium orthostannate ($Li_2SnO_3 \cdot 3H_2O$), sodium orthostannate ($Na_2SnO_3 \cdot 3H_2O$), magnesium stannate, calcium stannate, lead stannate, ammonium stannate, potassium metastannate ($K_2O \cdot 5SnO_2 \cdot 4H_2O$), sodium metastannate ($Na_2O \cdot 5SnO_2 \cdot 8H_2O$), etc. Examples of molybdates are orthomolybdates and metamolybdates. More specific examples are lithium molybdate ($Li_2MoO_4$), sodium molybdate ($Na_2MoO_4$), barium molybdate ($BaMoO_4$), potassium molybdate ($K_2MoO_4$), ammonium molybdate [$(NH_4)_6Mo_7O_{24} \cdot 4H_2O$] triethylamine molybdate, etc.

Preferable among these oxyacid salts are those of alkali metals which generally have high water solubilities.

Although somewhat variable with the kind of the oxyacid salt used, the amount of the salt to be used is usually about 0.001 to 10.0 parts by weight, preferably about 0.05 to 5.0 parts by weight, per 100 parts of the binder resin.

In the present invention, water-soluble salts of chromic acid can be used together with the above-mentioned oxyacid salts, whereby the anti-corrosive property of the resulting coating is further improved. The amount of the chromates to be used is less than 5 weight percent based on the binder resin. Examples of the chromates are lithium chromate ($Li_2CrO_4 \cdot 2H_2O$), sodium chromate ($Na_2CrO_4 \cdot 10H_2O$), potassium chromate ($K_2CrO_4$), ammonium chromate [$(NH_4)_2CrO_4$], calcium chromate ($CaCrO_4 \cdot 2H_2O$) and strontium chromate ($SrCrO_4$).

Aluminum alloys to be coated by the process of this invention include, for example, Al-Si, Al-Mg, Al-Mn or Al-Si-Mg. In the invention the aluminum and aluminum alloys can usually be used as substrates in various shaped forms.

To practice the present process, the aluminum or aluminum alloy serving as a substrate is subjected to dewaxing and etching procedures. The dewaxing is conducted by conventional methods, for example, by immersing the aluminum or aluminum alloy in acid, such as nitric acid, sulfuric acid, at room temperature for 5 to 60 minutes. In the etching procedure, the defacement and spontaneously formed oxide film are removed from the aluminum or aluminum alloy by conventional methods, for example, by immersing the aluminum or aluminum alloy in alkali solution.

The aluminum or aluminum alloy thus pretreated is then subjected to boehmite treatment in conventional manner. The boehmite treatment is usually conducted by contacting the product with hot water or steam containing or not containing ammonia and/or amines. Examples of the amines usable are monoethanolamine, diethanolamine, triethanolamine, dimethylethanolamine and like water-soluble amines. Generally, about 0.1 to 5 parts by weight of amine and/or ammonium are used per 100 parts by weight of water. The aluminum or aluminum alloy is kept in contact with hot water or steam usually for about 5 to 60 minutes. The temperature of hot water to be used is usually in the range of 65° to 100°C, preferably 70° to 80°C and that of steam in the range of 100° to 250°C, preferably 150° to 200°C. Such contact is effected by methods heretofore employed, for example, by immersion or spraying.

After the boehmite treatment, the aluminum or aluminum alloy substrate is electrophoretically coated with an electrophoretic coating composition containing at least one of the oxyacid salts.

The electrophoretic coating operation is conducted in conventional manner. For example, the substrate is immersed into the electrophoretic coating composition placed in a bath and connected to the positive electrode. Another electroconductive material is immersed in the composition in the same bath and connected to the negative electrode and then direct current is supplied between them. The voltage of said direct current is usually in the range of 30 to 400 volts.

The temperature of the composition in the bath may be in the range of between the solidifying point of the resin and the boiling point, however, temperature between 15°C and 40°C is preferable.

It is desirable to apply the electric current in the range of 30 seconds to 10 minutes for the process. The electrophoretic coating thus prepared is then washed with water to remove excess coating composition, dried to remove water, and heated at a temperature of 140° to 250°C for baking, whereby a uniform hardened coating is obtained.

The process of this invention will be described below in greater detail with reference to examples and comparison examples, in which the percentages and parts are all by weight unless otherwise specified. In the examples aluminum panels serving as substrates were prepared and electrophoretic coating operation was conducted according the procedures stated below.

PREPARATION OF SUBSTRATE

A substrate was prepared by dewaxing and etching an aluminum alloy panel measuring 70 mm in width, 150 mm in length and 2 mm in thickness (consisting of 98.0% aluminum, 0.45% Si, 0.55% Mg and 1% others; JIS H 4100) according to the following procedure given below:
 a. Immersion in 10% aqueous solution of nitric acid at room temperature for 5 minutes.
 b. Rinsing in water.
 c. Immersion in 5% aqueous solution of caustic soda at 50°C for 5 minutes.
 d. Rinsing in water.
 e. Immersion in 10% aqueous solution of nitric acid at room temperature for 1 minute.
 f. Rinsing in water.

ELECTROPHORETIC COATING OPERATION

Into a plastic container measuring 10 cm in width, 20 cm in length and 15 cm in depth was placed 2,000 cc of an electrophoretic coating composition, and the substrate serving as the anode and a mild steel plate serving as the cathode were immersed in the composition as spaced apart from each other by 15 cm. Electrophoretic coating operation was conducted at a liquid temperature of 25°C by applying a specified voltage for 2 minutes. The coated substrate was thereafter washed with water, dried and baked in a hot air at 200°C for 20 minutes.

EXAMPLE 1

500 parts of n-butanol was placed into a 2-liter 4-necked flask equipped with a stirrer, thermometer, reflux condenser, dropping funnel and means for introducing nitrogen gas and was heated to 90°C with stirring while introducing nitrogen gas into the flask. A mixture of 200 parts of styrene, 300 parts of ethylmethacrylate, 300 parts of n-butyl acrylate, 100 parts of acrylic acid, 100 parts of 2-hydroxyethyl acrylate and 20 parts of azobisisobutyronitrile was added dropwise to the n-butanol over a period of 2 hours. One hour after the completion of dropwise addition, a mixture of 5 parts of azobisisobutyronitrile and 50 parts of n-butanol was further added dropwise to the resulting mixture over a period of 30 minutes. The mixture was heated at a temperature of 95°C for 1 hour after the completion of dropwise addition and then cooled to 40°C to prepare a resin solution, which was taken out.

To 100 parts of the resin solution were added 35 parts of water-dispersible melamine resin (trade mark: Nikalac MX-40, product of Nippon Carbide Industries Co., Ltd., Japan, 100% solid resin), 7 parts of diethanolamine and 58 parts of deionized water, and the mixture was uniformly mixed together to obtain an aqueous solution containing about 50% of solids (hereinafter referred to as "aqueous resin solution A"). To 100 parts of the aqueous resin solution A was added 10 parts of 5% aqueous solution of potassium orthotungstate. To the mixture thereafter uniformly mixed was added 390 parts of deionized water to pepare a 10% electrophoretic coating composition.

The aluminum alloy substrate prepared by the foregoing procedure was immersed in boiling deionized water for 10 minutes for boehmite treatment. The substrate was then electrophoretically coated with the above coating composition at voltage of 100 volts to obtain a coated panel. Various properties of the coated panel obtained are given in Table 1 below.

EXAMPLES 2 to 6

A coated panel was prepared in the same manner as in Example 1 except that the amount given in Table 1 of the specified oxyacid salt was added in the form of 5% aqueous solution to 100 parts of the aqueous resin solution A used in Example 1. Various properties of the coated substrates obtained are given in Table 1 below.

COMPARISON EXAMPLE 1

To 100 parts of the aqueous resin solution used in Example 1 was added 400 parts of deionized water, and the mixture was uniformly mixed to prepare a 10% electrophoretic coating composition. The substrate was subjected to boehmite treatment in the same manner as in Example 1 and was thereafter electrophoretically coated with the composition at a voltage of 90 volts to obtain a coated panel.

COMPARISON EXAMPLE 2

An aluminum alloy panel prepared by the foregoing procedure as a substrate was electrophoretically coated at 90 volts with the coating composition obtained in Example 1 to prepare a coated panel without conducting the boehmite treatment.

COMPARISON EXAMPLE 3

An aluminum alloy panel prepared by the foregoing procedure was immersed in the chromate conversion coating composition shown below at 90°C for 3 minutes and thereafter electrophoretically coated with the coating composition obtained in Example 1 at a voltage of 90 volts to obtain a coated panel.

Chromate conversion coating composition

| | |
|---|---|
| Water | 100 weight parts |
| $Na_2CrO_4$ | 1.5 weight parts |
| $Na_2CO_3$ | 3 weight parts |

The coated panels obtained in Examples 1 to 6 and Comparison Examples 1 to 3 were tested to determine various properties thereof with the results given in Table 1 and Table 2 below. The testing method are as follows:

1. Coating thickness

Measured by a high-frequency thickness meter.

2. Hardness

Leave a test panel to stand in a constant temperature and constant humidity chamber at a temperature of 20° ± 1°C and a humidity of 75% for 1 hour. Fully sharpen a pencil (trade mark UNI, product of Mitsubishi Pencil Co., Ltd., Japan) by a pencil sharpener and then wear away the sharp pencil point to flatness. Firmly press the pencil against the coating surface of the test panel at an angle of 45° between the axis of the pencil and the coating surface and push the pencil forward at a constant speed of 3 sec/cm as positioned in this state. Repeat the same procedure 5 times with each of pencils having various hardness. The hardness of the coating is expressed in terms of the highest of the hardnesses of the pencils with which the coating remain unbroken at more than 4 strokes.

3. Cross-cut Erichsen test

After leaving a test panel to stand in a constant temperature and constant humidity chamber at a temperature of 20° + 1°C and a humidity of 75% for 1 hour, make eleven parallel cuts, 1 mm apart, in the coating film up to the surface of aluminum alloy substrate, using a single-edged razor blade. Make a similar set of cuts at right angles to the first cut to form 100 squares. Using an Erichsen film tester, push out the test panel 5 mm and apply a piece of cellophane adhesive tape to the pushed out portion. Press the tape firmly from above and thereafter remove the tape rapidly. The evaluation is expressed by a fraction in which the denominator is the number of squares formed and the numerator is the number of squares left unremoved. Thus 100/100 indicates that the coating remains completely unremoved.

4. Impact resistance

After leaving a test panel to stand in a constant temperature and constant humidity chamber at a temperature of 20° ± 1°C and a humidity of 75% for 1 hour, test the panel on a Du Pont impact tester (1-kg, ½ inch). Determine the largest height (cm) of the weight entailing no cracking in the coating.

5. Resistance to boiling water

Place deionized water into a beaker along with a boiling stone and heat to boiling. Boil a test panel for 3 hours in the water while keeping the panel spaced apart from the bottom of the beaker by 20 mm. Take out the test panel to check for any change in the coating such as discoloring, peeling, cracking or blistering. Furthermore after leaving the test panel to stand for 1 hour, conduct cross-cut Erichsen test in the same manner as above to evaluate the adhering ability.

6. Resistance to sulfurous acid

Into a glass container, place a 6% aqueous solution of sulfurous acid having a specific gravity of 1.03 and add deionized water to prepare a 1% aqueous solution of sulfurous acid. Immerse a test panel in the solution at 20°C for 72 hours and then take it out to check for any change in the coating such as discoloring, peeling, cracking and blistering with the unaided eye. In the same manner as above, conduct cross-cut Erichsen test to evaluate the adhering ability.

7. Alkali Resistance

Fill a glass container with a 5% aqueous solution of sodium hydroxide and immerse a test panel therein at 20°C for 72 hours. Then take out the test panel and inspect the surface with the unaided eye to check for any change in the coating such as peeling and blistering.

8. CASS test (Copper-Accelerated Acetic acid—Salt Spray Testing)

Conduct CASS test according to JIS H 8601 for 72 hours. Inspect the appearance of coating with the unaided eye.

9. Stability of the coating composition

Place about 4 liters of a coating composition in a stainless steel container measuring 18 cm in diameter and 25 cm in depth and equipped with a stirrer. Continuously stir the composition at about 200 r.p.m. while maintaining the composition at 30°C. Conduct electrophoretic coating test using the composition every week. Determine the longest period of stirring of the composition which produces a coating free of changes such as seediness, cissing and indentation.

Table 1

|  | Example | | | | | |
|---|---|---|---|---|---|---|
|  | 1 | 2 | 3 | 4 | 5 | 6 |
| Oxyacid salt | $K_2WO_4$ | $NaBO_2$ | $Na_2SiO_3$ | $K_3PO_4$ | $NaVO_3.4H_2O$ | $Sn(MnO_4)_2.3H_2O$ |
| Amount of salts (parts by weight per 100 parts of the binder resin) | 1.0 | 1.0 | 1.0 | 0.5 | 1.0 | 0.5 |
| Coating thickness ($\mu$) | 16 | 17 | 15 | 16 | 15 | 17 |
| Hardness | 3H | 3H | 3H | 3H | 3H | 3H |
| Cross-cut test | 100/100 | 100/100 | 100/100 | 100/100 | 100/100 | 100/100 |
| Impact resistance (cm) | 50 | 50 | 50 | 50 | 50 | 50 |
| Resistance to boiling water | | | | | | |
| Appearance | Good | Good | Good | Good | Good | Good |
| Adhering ability | 100/100 | 100/100 | 100/100 | 100/100 | 100/100 | 100/100 |
| Resistance to sulfurous acid | | | | | | |
| Appearance | Good | Good | Good | Good | Good | Good |
| Adhering ability | 100/100 | 100/100 | 100/100 | 100/100 | 100/100 | 100/100 |
| Alkali resistance | Good | Good | Good | Good | Good | Good |
| CASS test (Rating Number) | 10 | 10 | 10 | 10 | 10 | 10 |
| Stability of coating composition (week) | more than 5 | 3 | 3 | 3 | 4 | 4 |

Table 2

|  | Comparison Example | | |
|---|---|---|---|
|  | 1 | 2 | 3 |
| Oxyacid salt | — | $K_2WO_4$ | $K_2WO_4$ |
| Amount of salts (part by weight per 100 parts of the binder resin) | — | 1.0 | 1.0 |
| Coating thickness ($\mu$) | 16 | 18 | 16 |
| Hardness | 2H | 2H | 2H |
| Cross-cut test | 100/100 | 100/100 | 100/100 |
| Impact resistance (cm) | 50 | 40 | 50 |
| Resistance to boiling water | | | |
| Appearance | Good | Discoloring | Discoloring |
| Adhering ability | 100/100 | 70/100 | 75/100 |
| Resistance to sulfurous acid | | | |
| Appearance | Good | Blistering | Blistering |
| Adhering ability | 50/100 | 0/100 | 10/100 |
| Alkali resistance | Poor | Poor | Poor |
| CASS test (Rating Number) | 9.0 | 8.5 | 10 |
| Stability of coating composition (week) | 1 | 5 | 5 |

EXAMPLE 7

With 100parts of an aqueous solution of acrylic resin (trade mark: Aron 4002, product of Toa Gosei Chemical Industry Co., Ltd., Japan, 50% solid resin) was mixed 20 parts of water-dispersible melamine resin (trade mark: Nikalac MX-40, product of Nippon Carbide Industries Co., Ltd., Japan, 100% solid resin). To the mixture was added 7.0 parts of a 10% aqueous solution of potassium stannate, followed by full stirring to obtain a uniform mixture, to which deionized water and triethylamine were further added to prepare a coating composition containing 10% solids and having a pH of 8.0.

The same aluminum alloy panel as used in Example 1 was coated with the composition in the same manner as in Example 1.

EXAMPLES 8 and 10

Coated panels were prepared in the same manner as in Example 7 except that the specified oxyacid salts were used in place of potassium stannate.

Various properties of the coated pannels obtained in Examples 7 to 10 are shown in Table 3 below.

Table 3

|  | Example | | | |
|---|---|---|---|---|
|  | 7 | 8 | 9 | 10 |
| Oxyacid salt | $K_2SnO_3.3H_2O$ | $K_2MoO_4$ | $Na_2WO_4.2H_2O$ $Na_2MoO_4$ | $KBO_2$ $Na_2CrO_4.1OH_2O$ |
| Amount of salts (Parts by weight per 100 weight parts of the binder resin) | 1.0 | 5.0 | Each 0.5 | Each 1.0 |
| Coating thickness ($\mu$) | 20 | 16 | 16 | 17 |
| Hardness | 3H | 3H | 3H | 3H |
| Cross-cut test | 100/100 | 100/100 | 100/100 | 100/100 |
| Impact resistance (cm) | 50 | 50 | 50 | 50 |
| Resistance to boiling water | | | | |
| Appearance | Good | Good | Good | Good |
| Adhering ability | 100/100 | 100/100 | 100/100 | 100/100 |
| Resistance to sulfurous acid | | | | |
| Appearance | Good | Good | Good | Good |
| Adhering ability | 100/100 | 100/100 | 100/100 | 100/100 |
| Alkali resistance | Good | Good | Good | Good |
| CASS test (Rating Number) | 10 | 10 | 10 | 10 |
| Stability of coating composition (week) | 5 | 5 | 5 | 3 |

What we claim is:

1. In coating aluminum or an aluminum alloy by contacting the aluminum or aluminum alloy with hot water or steam to form a boehmite layer on its surface and thereafter electrophoretically coating the aluminum or aluminum alloy with an electrophoretic coating composition to form a resin layer, a process which is characterized in that said electrophoretic coating composition contains at least one water-soluble salt of an oxyacid selected from the group consisting of silicic acid, boric acid, phosphoric acid, vanadic acid, tungstic acid, permanganic acid, molybdic acid and stannic acid, wherein said water-soluble salt is contained in an amount of 0.001 to 10 parts by weight, based on 100 parts by weight of the binder resin contained in the electrophoretic coating composition.

2. The process according to claim 1, in which said amount of the water-soluble salt is in the range of 0.5 to 5.0 parts by weight, base on 100 parts by weight of the binder resin contained in the electrophoretic coating composition.

3. The process according to claim 1, in which said water-soluble salt is at least one water-soluble salt or silicic acid.

4. The process according to claim 1, in which said water-soluble salt is at least one water-soluble salt of boric acid.

5. The process according to claim 1, in which said water-soluble salt is at least one water-soluble salt of phosphoric acid.

6. The process according to claim 1, in which said water-soluble salt is at least one water-soluble salt of vanadic acid.

7. The process according to claim 1, in which said water-soluble salt is at least one water-soluble salt of tungstic acid.

8. The process according to claim 1, in which said water-soluble salt is at least one water-soluble salt of permanganic acid.

9. The process according to claim 1, in which said water-soluble salt is at least one water-soluble salt of molybdic acid.

10. The process according to claim 1, in which said water-soluble salt is at least one water-soluble salt of stannic acid.

11. An aluminum or aluminum alloy coated by the process of claim 1.

* * * * *